(12) United States Patent
Zhang et al.

(10) Patent No.: US 12,451,530 B2
(45) Date of Patent: Oct. 21, 2025

(54) BATTERY AND DEVICE (71) Applicant: JIANGSU CONTEMPORARY AMPEREX TECHNOLOGY LIMITED, Liyang (CN)

(72) Inventors: Fan Zhang, Liyang (CN); Sien Chen, Liyang (CN)

(73) Assignee: JIANGSU CONTEMPORARY AMPEREX TECHNOLOGY LIMITED, Changzhou (CN)

( * ) Notice: Subject to any disclaimer, the term of this patent is extended or adjusted under 35 U.S.C. 154(b) by 791 days.

(21) Appl. No.: 17/847,203

(22) Filed: Jun. 23, 2022

(65) Prior Publication Data

US 2022/0336874 A1 Oct. 20, 2022

Related U.S. Application Data (63) Continuation of application No. PCT/CN2021/081760, filed on Mar. 19, 2021.

(30) Foreign Application Priority Data

Dec. 18, 2020 (CN) .......................... 202011507137.8

(51) Int. Cl.
*H01M 10/48* (2006.01)
*H01M 50/209* (2021.01)
(Continued)

(52) U.S. Cl.
CPC ....... *H01M 10/482* (2013.01); *H01M 10/486* (2013.01); *H01M 50/209* (2021.01);
(Continued)

(58) Field of Classification Search
CPC ..................... H01M 50/569; H01M 50/50–519
See application file for complete search history.

(56) References Cited

U.S. PATENT DOCUMENTS

2008/0286642 A1* 11/2008 Naito .................. H01M 50/213
429/100
2010/0248008 A1* 9/2010 Sugawara ........... H01M 50/569
429/159
(Continued)

FOREIGN PATENT DOCUMENTS

CN 101946342 A 1/2011
CN 102354774 A 2/2012
(Continued)

OTHER PUBLICATIONS

WO2011093105A1—machine translation (Year: 2011).*
(Continued)

*Primary Examiner* — Haroon S. Sheikh
(74) *Attorney, Agent, or Firm* — K&L Gates LLP (57) ABSTRACT The embodiments of the application provide a battery and a device. The battery includes at least two battery units, wherein the battery unit is provided with a casing and two electrode connecting portions which are arranged on two sides of the casing and have opposite polarities, and the battery units include a first battery unit and a second battery unit which are connected in series; a conductive component arranged on one side of the casing and for being electrically connected to one of the two electrode connecting portions of the first battery unit and the casing of one of the first battery unit and the second battery unit; and a signal detection component arranged on the other side of the casing. The embodiments of the application can simplify the wiring of the signal detection circuit, improve reliability of the signal detection circuit, and then improve safety performance of the battery.

12 Claims, 7 Drawing Sheets (51) Int. Cl.
*H01M 50/503* (2021.01)
*H01M 50/51* (2021.01)
*H01M 50/569* (2021.01)
*H01M 50/583* (2021.01)

(52) U.S. Cl.
CPC ......... *H01M 50/503* (2021.01); *H01M 50/51* (2021.01); *H01M 50/569* (2021.01); *H01M 50/583* (2021.01); *H01M 2200/103* (2013.01)

(56) References Cited

U.S. PATENT DOCUMENTS

| | | | | |
|---|---|---|---|---|
| 2012/0019061 | A1* | 1/2012 | Nishihara | H01M 10/482 429/7 |
| 2015/0064516 | A1 | 3/2015 | Swoish | |
| 2015/0140373 | A1* | 5/2015 | Han | H01M 50/583 429/61 |
| 2018/0164382 | A1* | 6/2018 | Kataoka | G01R 31/396 |
| 2020/0044201 | A1 | 2/2020 | Ruehle et al. | |

FOREIGN PATENT DOCUMENTS

| | | | |
|---|---|---|---|
| CN | 103608946 | A | 2/2014 |
| CN | 206490144 | U | 9/2017 |
| CN | 209200023 | U | 8/2019 |
| CN | 111313119 | A | 6/2020 |
| CN | 112242594 | A | 1/2021 |
| JP | 2001325931 | A | 11/2001 |
| JP | 2003077442 | A | 3/2003 |
| JP | 2004-152706 | A | 5/2004 |
| JP | 2004-362958 | A | 12/2004 |
| JP | 2005166584 | A | 6/2005 |
| JP | 2011159518 | A | 8/2011 |
| JP | 5825991 | B2 | 12/2015 |
| JP | 2018097988 | A | 6/2018 |
| KR | 20030057360 | A | 7/2003 |
| KR | 20130107854 | A | 10/2013 |
| KR | 20150057889 | A | 5/2015 |
| WO | WO-2011093105 | A1 * | 8/2011 .......... H01M 50/227 |
| WO | 2017047258 | A1 | 3/2017 |

OTHER PUBLICATIONS

Notice of Reasons for Refusal received in the corresponding Japanese Application 2022-538376, mailed Dec. 11, 2023.
The extended European search report received in the corresponding European Application 21904823.8, mailed Jun. 29, 2023.
Second Office Action received in the corresponding Japanese Application 2022-538376, mailed Jun. 27, 2023.
International Search Report received in the corresponding International Application PCT/CN2021/081760, mailed May 26, 2021.
First Office Action received in the corresponding Japanese Application 2022-538376, mailed Jan. 23, 2023.
Notice of Allowance received in the corresponding Korean Application 10-2022-7022174, mailed Nov. 28, 2022.

* cited by examiner

BATTERY AND DEVICE

CROSS REFERENCE TO RELATED APPLICATION

The application is a continuation application of PCT/CN2021/081760, filed on Mar. 19, 2021, which claims the priority of Chinese Patent Application No. 202011507137.8, filed on Dec. 18, 2020 and entitled "Battery and Device", all of which are incorporated in its entirety herein by reference.

TECHNICAL FIELD

The application relates to the technical field of energy storage equipment, in particular to a battery and a device.

BACKGROUND ART

An increasingly perfect electric vehicle technology closes the distance between electric vehicles and people's lives, and the electric vehicles raises higher performance requirements for their batteries supplying energy. In order to improve the energy storage capacity of the battery, a plurality of battery units are usually arranged side by side in the battery. Moreover, it is necessary to collect and detect electrical parameters (such as voltage or temperature) of a plurality of battery units so as to ensure the safety of the battery. However, an existing signal detection component for collecting and detecting the electrical parameters is poor in reliability due to complex wiring.

SUMMARY OF THE INVENTION

Aiming at solving the problem of poor reliability caused by complex wiring of a signal detection component in a battery, the embodiments of the application provide a battery and a device.

The embodiment of a first aspect of the application provides the battery. The battery includes at least two battery units, where the battery unit is provided with a casing and two electrode connecting portions which are arranged on two sides of the casing and have opposite polarities, and the battery units include a first battery unit and a second battery unit which are connected in series; a conductive component arranged on one side of the casing and for being electrically connected to one of the two electrode connecting portions of the first battery unit and the casing of one of the first battery unit and the second battery unit; and a signal detection component arranged on the other side of the casing and provided with a signal detection circuit for being electrically connected to the other one of the two electrode connecting portions of the first battery unit and the casing of one of the first battery unit and the second battery unit, where the signal detection circuit and the conductive component are electrically connected to the casing of the same battery unit such that the signal detection circuit may form, along with the two electrode connecting portions of the first battery unit, a detection loop by means of the casing of the same battery unit and the conductive component, so as to detect a temperature or voltage signal of the first battery unit.

In some embodiments, the battery further includes a first bus component arranged on one side of the casing and for being electrically connected to the electrode connecting portions of the first battery unit and the second battery unit, so as to realize a series connection. The conductive component is used for being electrically connected to the first bus component and the casing.

By arranging the first bus component, the first battery unit and the second battery unit may be connected in series, and the first bus component is provided with electrical parameters of the two electrode connecting portions positioned on one side of the first battery unit and one side of the second battery unit. The conductive component is connected to the first bus component and the casing and may transmit electrical parameter information of the two electrode connecting portions to the other side of the casing by means of the conductive component and the casing, and the signal detection circuit may detect temperature or voltage signals of the first battery unit and the second battery unit on the other side of the casing, so as to further simplify a circuit arrangement of the whole detection loop, and improve reliability of the detection loop.

In some embodiments, one side of the first bus component extends outwards to from the conductive component. That is, the conductive component and the first bus component are integrally formed such that structures of the conductive component and the first bus component may be simplified, and stability and reliability of a connection between the conductive component and the first bus component may be improved.

In some embodiments, the conductive component includes a first pin and a second pin which are connected to each other, the first pin being used for being electrically connected to the first bus component, and the second pin being used for being electrically connected to the casing. In this way, connections between the conductive component and the first bus component and between the conductive component and the casing may not affect each other, and assembly of the battery may be simplified.

In some embodiments, the first pin and the second pin are arranged separately, and the battery further includes a connecting component for being electrically connected to the first pin and the second pin.

In some embodiments, the connecting component is provided with a first fusing portion for fusing when a current reaches a threshold value such that an open circuit is formed between the first pin and the second pin. In this way, safety performance of the battery may be improved.

In some embodiments, the two electrode connecting portions include a first electrode connecting portion and a second electrode connecting portion, the battery unit further includes a third battery unit connected to the second battery unit in series, and the first electrode connecting portions and the second electrode connecting portions are alternately distributed in sequence on the same side of the casing. The first bus component is used for being connected to the first electrode connecting portion of the first battery unit and the second electrode connecting portion of the second battery unit. The battery further includes a second bus component arranged on the other side of the casing and for being connected to the first electrode connecting portion of the second battery unit and the second electrode connecting portion of the third battery unit. The signal detection circuit is used for being electrically connected to the second electrode connecting portion of the first battery unit, the second bus component and the casing.

The first electrode connecting portions and the second electrode connecting portions are alternately distributed in sequence on the same side of the casing, such that the first bus component on one side of the casing and the second bus component on the other side of the casing may be connected to the different electrode connecting portions of the different battery units. For example, the first bus component is connected to the first electrode connecting portion of the first battery unit and the second electrode connecting portion of the second battery unit, and the second bus component is connected to the first electrode connecting portion of the second battery unit and the second electrode connecting portion of the third battery unit such that three or more battery units may be connected in series by means of the first bus component and the second bus component.

In addition, the first electrode connecting portion of the first battery unit forms, along with the second electrode connecting portion of the first battery unit, a detection loop by means of the first bus component, the conductive component, the casing of the same battery unit and the signal detection circuit such that the signal detection component may detect the temperature or voltage signal of the first battery unit.

The second electrode connecting portion of the second battery unit is connected to the first bus component, the first electrode connecting portion of the second battery unit is connected to the second bus component, and the second electrode connecting portion of the second battery unit forms, along with the first electrode connecting portion of the second battery unit, a detection loop by means of the first bus component, the conductive component, the casing of the same battery unit, the signal detection circuit and the second bus component such that the signal detection component may detect the temperature or voltage signal of the second battery unit.

In some embodiments, the conductive component is provided with a second fusing portion for fusing when a current reaches a threshold value such that an open circuit is formed between the electrode connecting portion and the casing. In this way, safety performance of the battery may be improved.

In some embodiments, a partial section of the conductive component shrinks to form the second fusing portion.

In some embodiments, a partial section of the second fusing portion is relatively small. When the current reaches the threshold value, the second fusing portion fuses before the other positions of the conductive component fuse, such that the conductive component breaks from a position where the second fusing portion is positioned, and an electrical connection between the electrode connecting portion and the casing is broken. In addition, the partial section of the conductive component shrinks to form the second fusing portion such that a structure of the conductive component may be simplified, a fuse does not need to be arranged in the conductive component, the conductive component may be conveniently processed, formed and mounted, and manufacturing and mounting cost of the battery is reduced.

In some embodiments, the electrode connecting portion extends, in a first direction, out of an outer surface of the casing. The casing is provided with a first connecting portion, the conductive component is provided with a second connecting portion, at least one of the first connecting portion and the second connecting portion extends in the first direction, and the first connecting portion and the second connecting portion are connected to each other such that the conductive component is connected to the casing. By means of the first connecting portion and/or the second connecting portion, a difference of a height, extending out of an outer surface of the casing, of the electrode connecting portion may be made up, such that the connection between the conductive component and the casing is more stable.

In some embodiments, the first connecting portion protrudes, in the first direction, out of the outer surface of the casing. The second connecting portion is in lap joint with a surface, away from the casing, of the first connecting portion or the second connecting portion is arranged around a peripheral side of the first connecting portion.

The embodiment of a second aspect of the application provides a device including the battery of any one of the embodiments of the first aspect, the battery being used for supplying electrical energy.

The battery provided in the embodiments of the first aspect of the application includes the battery unit, the conductive component and the signal detection component. The battery unit is provided with the casing and the two electrode connecting portions which have the opposite polarities, the first battery unit and the second battery unit are connected to each other in series, and the conductive component is used for connecting one of the electrode connecting portions of the first battery unit to the casing of one of the first battery unit and the second battery unit, such that the casing is provided with an electrical signal of the electrode connecting portion. The signal detection circuit of the signal detection component is electrically connected to the other electrode connecting portion of the first battery unit and the casing, and the signal detection circuit and the conductive component are connected to the same casing. That is, one electrode connecting portion, positioned on one side of the casing, of the first battery unit may be connected to the signal detection circuit by means of the casing and the conductive component, and meanwhile, the signal detection circuit is further connected to the other electrode connecting portion, positioned on the other side of the casing, of the first battery unit. Therefore, the signal detection circuit may form, along with the two electrode connecting portions of the first battery unit, the detection loop by means of the conductive component and the casing such that the signal detection component may detect the temperature or voltage signal of the first battery unit.

In the embodiments of the application, the signal detection component is arranged on the other side of the casing, the signal detection circuit may be connected to the two electrode connecting portions, positioned on the two sides of the casing, in the first battery unit on the same side of the casing, and the signal detection circuit does not need to stretch across the two sides of the casing. Therefore, the embodiments of the application may simplify a wiring manner of the signal detection circuit, improve reliability of the signal detection circuit, and then improve safety performance of the battery.

BRIEF DESCRIPTION OF THE DRAWINGS

In order to describe the technical solutions in the embodiments of the application more clearly, the accompanying drawings required for describing the embodiments are briefly described below. Obviously, the accompanying drawings in the following description show merely some embodiments of the present disclosure, and a person of ordinary skill in the art would also be able to derive other accompanying drawings from these accompanying drawings without creative efforts.

Other features, objectives and advantages of the application will become more apparent by reading the detailed description on non-limiting embodiments made with reference to the following accompanying drawings, where the same or similar reference numerals refer to the same or similar features.

In the drawings, the components are not drawn to actual scale.

SPECIFIC EMBODIMENTS

The features and exemplary embodiments of various aspects of the application will be described in detail below. In the following detailed description, many specific details are set forth to provide a thorough understanding of the application. However, it will be obvious to those skilled in the art that the application may be implemented without some of these specific details. The following description of the embodiments is merely to provide a better understanding of the application by means of illustration of examples of the application. In the accompanying drawings and the following description, at least part of well-known structures and technologies are not shown in order to avoid unnecessarily ambiguity of the application; and sizes of part of the structures may be exaggerated for clarity. In addition, features and structures or features described below may be combined in a suitable manner in any one or more embodiments.

In the description of the application, the following is to be noted: unless otherwise specified, "plurality" means two or more; the terms "upper", "lower", "left", "right", "inner", "outer", etc. indicate azimuthal or positional relations only for ease of description of the application and for simplicity of description, and are not intended to indicate or imply that the referenced device or element must have a particular orientation and be constructed and operative in a particular orientation, and thus may not be construed as a limitation on the application. In addition, terms "first", "second", etc. are merely for description and may not be understood as indication or implication of relative importance.

Nouns of locality appearing in the following description are orientation shown in the accompanying drawings and are not intended to limit the specific structure of the embodiments of the application. In the application, it should be also noted that unless expressly specified otherwise, terms "mount" and "connect" are to be understood broadly, for example, components may be fixedly connected, detachably connected or integrally connected; and may be directly connected or indirectly connected. The specific meanings of the above terms in the application may be understood on a case-by-case basis for those with ordinary skills in the art.

In the application, battery cells may include a lithium ion secondary battery, a lithium ion primary battery, a lithium-sulfur battery, a sodium lithium-ion battery, a sodium ion battery or a magnesium ion battery, etc., which is not limited by the embodiments of the application. The battery cell may be in cylindrical, flat, cuboid or other shapes, which is not limited by the embodiments of the application. Generally, the battery cells are divided into three types according to packaging manners: cylindrical battery cells, square battery cells and pouch battery cells, which is not limited by the embodiments of the application.

The battery mentioned in the embodiments of the application refers to a single physical module which includes one or a plurality of battery cells and therefore provides a higher voltage and capacity. For example, the battery mentioned in the application may include a battery module or a battery pack, etc. Generally, the battery includes a box for packaging one or a plurality of battery cells. The box may prevent liquid or other foreign matter from affecting charging or discharging of the battery cell.

The battery cell includes an electrode assembly and an electrolyte, where the electrode assembly is composed of a positive plate, a negative plate and a separator film. The battery cell works mainly depending on movement of metal ions between the positive plate and the negative plate. The positive plate includes a positive current collector and a positive active material layer, the positive active material layer coating a surface of the positive current collector, a current collector not coated with the positive active material layer protrudes out of a current collector coated with the positive active material layer, and the current collector not coated with the positive active material layer serves as a positive tab. With a lithium ion battery as an example, a positive current collector may be made from aluminum, and the positive active material may be lithium cobalt oxide, lithium iron phosphate, ternary lithium or lithium manganate, etc. The negative plate includes a negative current collector and a negative active material layer, the negative active material layer coating a surface of the negative current collector, a current collector not coated with the negative active material layer protrudes out of a current collector coated with the negative active material layer, and the negative current collector not coated with the negative active material layer serves as a negative tab. The negative current collector may be made from copper, and the negative active material may be carbon, silicon, etc. In order to guarantee fusing does not occur during large current flow, a plurality of positive tabs are stacked together, and a plurality of negative tabs are stacked together. The separator film may be made of polypropylene (PP) or polyethylene (PE), etc. In addition, the electrode assembly may be in a wound structure or a laminated structure, which is not limited in the embodiments of the application. The positive tab and the negative tab of the battery cell are electrically connected to two electrode terminals with opposite polarities on the battery cell respectively, so as to output electrical energy.

At present, in order to improve the space utilization rate of the battery pack, a plurality of battery cells in the battery pack generally lie on their sides, that is, the electrode terminals of the battery cell are positioned on two sides in a horizontal direction of the battery cell. A detection circuit for collecting temperature or voltage signals of the battery cells needs to be connected to the two electrode terminals of the battery cell, so as to form, along with the two electrode terminals, a detection loop. When the electrode terminals of the battery cell are positioned on the two sides in the horizontal direction of the battery cell, the detection circuit needs to be arranged on the two sides of the battery cell, such that wiring of the detection circuit is complex, reliability of the detection circuit is reduced, cost of the detection circuit is high, and safety performance of the battery is reduced.

In order to solve the above technical problems, the application is provided. For a better understanding of the application, a battery and a device of the embodiments of the application are described below in detail with reference to FIGS. 1-13.

The embodiments of the first aspect of the application provide an electric device using a battery as an electric source. The electric device may be, but is not limited to, a vehicle, a ship, an aircraft, etc.

The technical solutions described in the embodiments of the application are applicable to various devices using batteries, such as mobile phones, portable devices, notebook computers, electromobiles, electric toys, electric tools, electric vehicles, ships and spacecrafts, for example, the spacecrafts include airplanes, rockets, space shuttles, spaceships, etc.

It should be understood that the technical solutions described in the embodiments of the application are not only applicable to the devices described above, but also applicable to all devices using batteries. However, for simplicity of description, the following embodiments will be described by taking an electric vehicle as an example.

Figure 1:
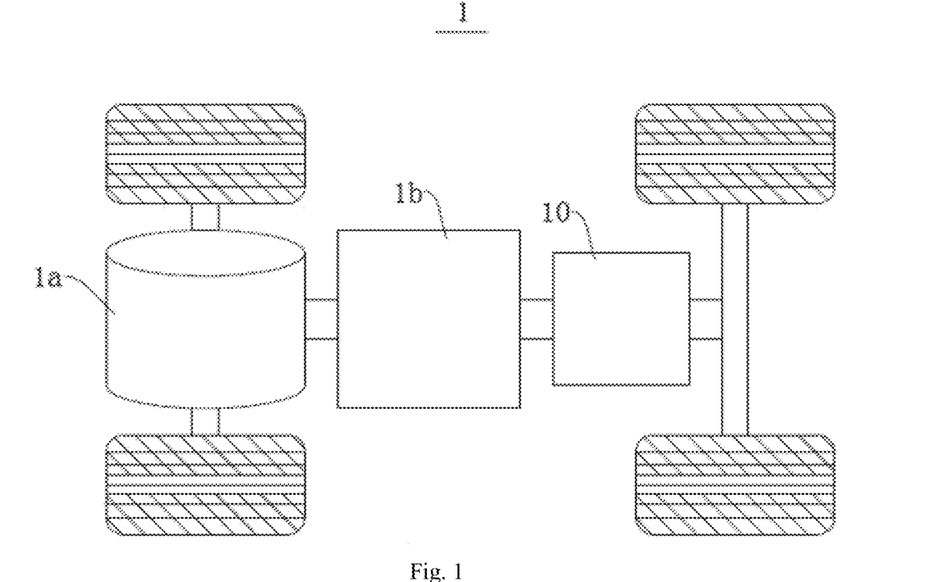
FIG. 1 is a structural schematic diagram of a vehicle provided in the embodiments of the application.

With reference to FIG. 1, one embodiment of the application provides a vehicle 1. The vehicle 1 may be a fuel vehicle, a gas vehicle or a new energy vehicle. The new energy vehicle may be a battery electric vehicle, a hybrid electric vehicle, an extended-range vehicle, etc.

In one embodiment of the application, the vehicle 1 may include a motor 1*a*, a controller 1*b*, and the battery 10, where the controller 1*b* is used for controlling the battery 10 to supply power to the motor 1*a*; the motor 1*a* is connected to wheels by means of a transmission mechanism, thereby driving the vehicle 1 to travel; and the battery 10 may be used as a driving power source for the vehicle 1 to provide driving power for the vehicle 1 instead of or partially instead of fuel or natural gas.

In one example, the battery 10 may be arranged at a bottom or headstock or tailstock of the vehicle 1. The battery 10 may be used to supply power to the vehicle 1. In one example, the battery 10 may be used as an operational power source of the vehicle 1 for a circuit system of the vehicle 1. In some embodiments, the battery 10 may be used for meeting operating power requirements during start-up, navigation, and operation of a vehicle 1.

Figure 2:
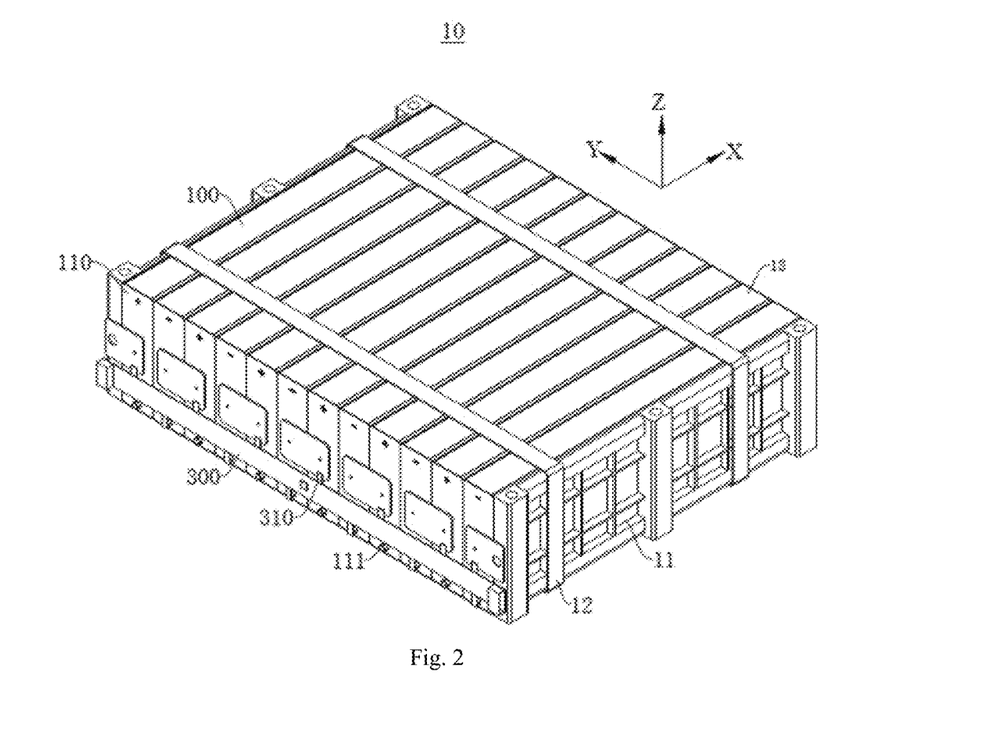
FIG. 2 is a structural schematic diagram of a battery provided in the embodiments of the application.
Figure 3:
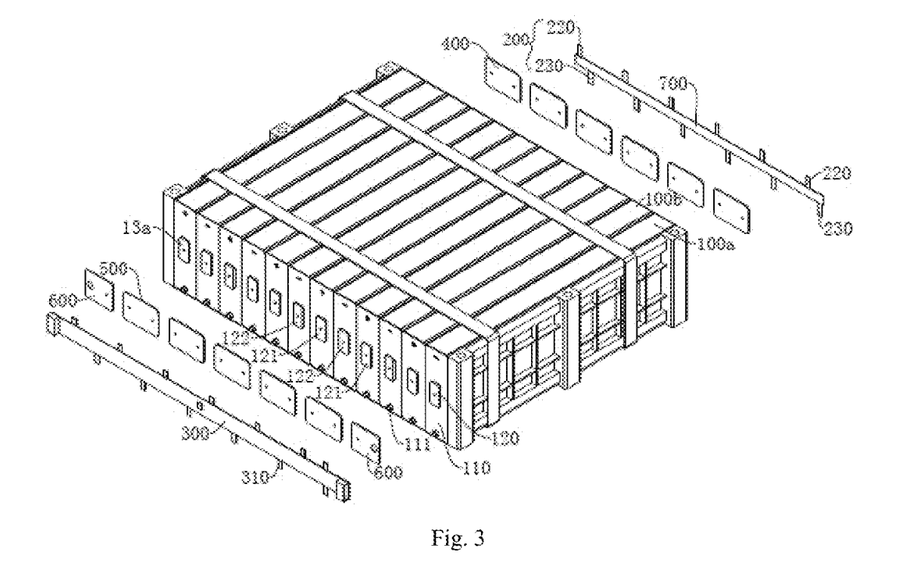
FIG. 3 is an exploded view of the battery provided in the embodiments of the application.

With reference to FIGS. 2 and 3, FIG. 2 is a structural schematic diagram of a battery 10 provided in the embodiments of the application; and FIG. 3 is an exploded view of the battery 10 provided in the embodiments of the application.

The battery 10 provided in the embodiments of the application includes at least two battery units 100, where each battery unit 100 is provided with a casing 110 and two electrode connecting portions 120 which are arranged on two sides of the casing 110 and have opposite polarities, and the battery units 100 include a first battery unit 100*a* and a second battery unit 100*b* which are connected in series; a conductive component 200 arranged on one side of the casing 110 and for being electrically connected to one of the two electrode connecting portions 120 of the first battery unit 100*a* and the casing 110 of one of the first battery unit 100*a* and the second battery unit 100*b*; and a signal detection component 300 arranged on the other side of the casing 110 and provided with a signal detection circuit 310 for being electrically connected to the other of the two electrode connecting portions 120 of the first battery unit 100*a* and the casing 110 of either of the first battery unit 100*a* and the second battery unit 100*b*, where the signal detection circuit 310 and the conductive component 200 are electrically connected to the casing 110 of the same battery unit 100 such that the signal detection circuit 310 may form, along with the two electrode connecting portions 120 of the first battery unit 100*a*, a detection loop by means of the casing 110 of the same battery unit 100 and the conductive component 200, so as to detect a temperature or voltage signal of the first battery unit 100*a*.

The battery 10 provided in the embodiments of the first aspect of the application includes the battery unit 100, the conductive component 200 and the signal detection component 300. The battery unit 100 is provided with the casing 110 and the two electrode connecting portion 120 which have the opposite polarities, the first battery unit 100*a* and the second battery unit 100*b* are connected to each other in series, and the conductive component 200 is used for connecting one of the electrode connecting portion 120 of the first battery unit 100*a* to the casing 110 of either of the first battery unit 100*a* and the second battery unit 100*b*, such that the casing 110 is provided with an electrical signal of the electrode connecting portion 120. The signal detection circuit 310 of the signal detection component 300 is electrically connected to the other electrode connecting portion 120 of the first battery unit 100*a* and the casing 110, and the signal detection circuit 310 and the conductive component 200 are connected to the same casing 110. The signal detection component 300 may be a printed circuit board (PCB) or a flexible circuit board (FPC), and the signal detection circuit 310 may be a metal conductive foil, such as a copper foil or an aluminum foil, arranged on the PCB or FPC. One electrode connecting portion, positioned on one side of the casing 110, of the first battery unit 100*a* may be connected to the signal detection circuit 310 by means of the casing 110 and the conductive component 200. Meanwhile, the signal detection circuit 310 is further connected to the other electrode connecting portion 120, positioned on the other side of the casing 110, of the first battery unit 100*a*. Therefore, the signal detection circuit 310 may form, along with the two electrode connecting portions 120 of the first battery unit 100*a*, the detection loop by means of the conductive component 200 and the casing 110 such that the signal detection component 300 may detect the temperature or voltage signal of the first battery unit 100*a*.

In the embodiments of the application, the signal detection component 300 is arranged on the other side of the casing 110, the signal detection circuit 310 may be connected to the two electrode connecting portion 120, positioned on the two sides of the casing 110, in the first battery unit 100*a* on the same side of the casing 110, and the signal detection circuit 310 does not need to stretch across the two sides of the casing 110. Therefore, the embodiments of the application may simplify a wiring manner of the signal detection circuit 310, improve reliability of the signal detection circuit 310, and then improve safety performance of the battery 10.

Moreover, in the battery 10 provided in the embodiments of the application, the casing 110 of the battery unit 100 and the electrode connecting portion 120 are connected to each other by means of the conductive component 200. This way may solve a safety problem caused by an insulation failure between the electrode connecting portion 120 and the casing 110, and improve the safety performance of the battery 10 compared with a way that the electrode connecting portion 120 of the battery unit 100 is directly connected to the casing 110.

The battery unit 100 may include one battery cell 13, or the battery unit 100 includes two or more battery cells 13 which are connected to each other in parallel. When the battery unit 100 includes one battery cell 13, the casing 110 of the battery unit 100 is the casing 110 of the battery cell 13, and the electrode connecting portion 120 is an electrode terminal 13a of the battery cell 13. When the battery unit 100 includes two or more battery cells 13 which are connected to each other in parallel, the casing 110 of the battery unit 100 may be the casing 110 of any one of the two or more battery cells 13 which are connected to each other in parallel, the electrode connecting portion 120 of the battery unit 100 may be the electrode terminal 13a of any one of the battery cells 13, or the electrode connecting portion 120 of the battery unit 100 is an electrode terminal group formed by the electrode terminals 13a which have the same polarity and are connected to each other in parallel in two or more battery cells 13.

In the embodiments of the application, when the battery unit 100 including one battery cell 13 is taken as an example, the casing 110 of the battery unit 100 is the casing 110 of the battery cell 13, and the electrode connecting portion 120 of the battery unit 100 is the electrode terminal 13a of the battery cell 13.

When the battery unit 100 includes one battery cell 13, the battery 10 includes at least two battery cells 13, the battery cell 13 is provided with the casing 110 and the electrode terminals 13a which are arranged on the two sides of the casing 110 and have opposite polarities, and the battery cells 13 include a first battery cell and a second battery cell which are connected in series. The conductive component 200 is used for connecting one of the electrode terminals 13a of the first battery cell and the casing 110 of one of the first battery cell and the second battery cell. For example, the conductive component 200 is used for being connected to one of the electrode terminals 13a of the first battery cell and the casing 110 of the second battery cell. The signal detection circuit 310 of the signal detection component 300 is used for being electrically connected to the other electrode terminal 13a of the first battery cell and the casing 110 of the second battery cell.

Therefore, one of the electrode terminals 13a of the first battery cell forms, along with the other electrode terminal 13a of the first battery cell, a detection loop by means of the conductive component 200, the casing 110 of the second battery unit 100b and the signal detection circuit 310 such that the signal detection component 300 may detect a temperature or voltage signal of the first battery cell by means of the signal detection circuit 310.

In some other embodiments, the conductive component 200 may be also connected to one of the electrode terminals 13a of the first battery cell and the casing 110 of the first battery cell, and the signal detection circuit 310 may be connected to the other electrode terminal 13a of the first battery cell and the casing 110 of the first battery cell. The signal detection circuit 310 forms, along with the two electrode terminals 13a of the first battery cell, the detection loop by means of the conductive component 200 and the casing 110 of the first battery cell such that the signal detection component 300 may detect the temperature or voltage signal of the first battery cell by means of the signal detection circuit 310.

In the embodiments of the application, the electrical signal on the electrode terminal 13a positioned on one side of the casing 110 is transmit to the other side of the casing 110 by means of the conductive component 200 and the casing 110 such that the signal detection circuit 310 may be connected to the two electrode terminal 13a of the first battery cell on the other side of the casing 110. Therefore, the signal detection circuit 310 does not need to stretch across the two sides of the casing 110 such that the wiring manner of the signal detection circuit 310 may be simplified, the reliability of the signal detection circuit 310 may be improved, and accordingly, the safety performance of the battery 10 may be improved.

The two sides of the casing 110 are, for example, two sides in a length direction (X direction in FIG. 2) of the casing 110, and the two sides of the casing 110 include a first side and a second side, the conductive component 200 being positioned on the first side, and the signal detection component 300 being positioned on the second side. That is, one side of the casing 110 is the first side, and the other side of the casing 110 is the second side.

Figure 4:
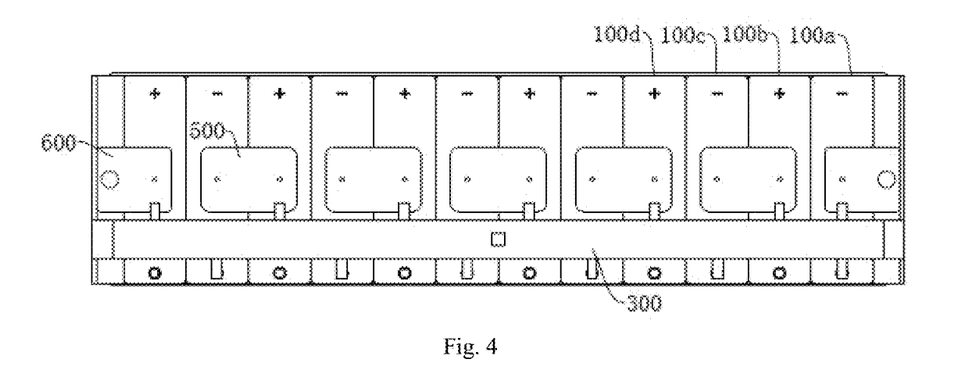
FIG. 4 is a structural schematic diagram of a second side of the battery provided in the embodiments of the application.
Figure 5:
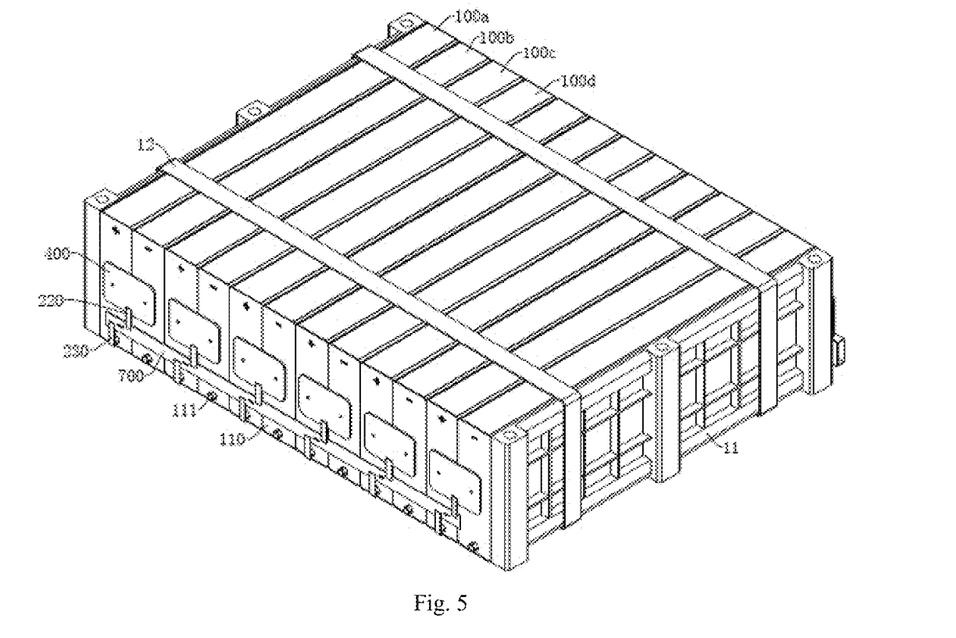
FIG. 5 is a structural schematic diagram, in another view, of the battery provided in the embodiments of the application.
Figure 6:
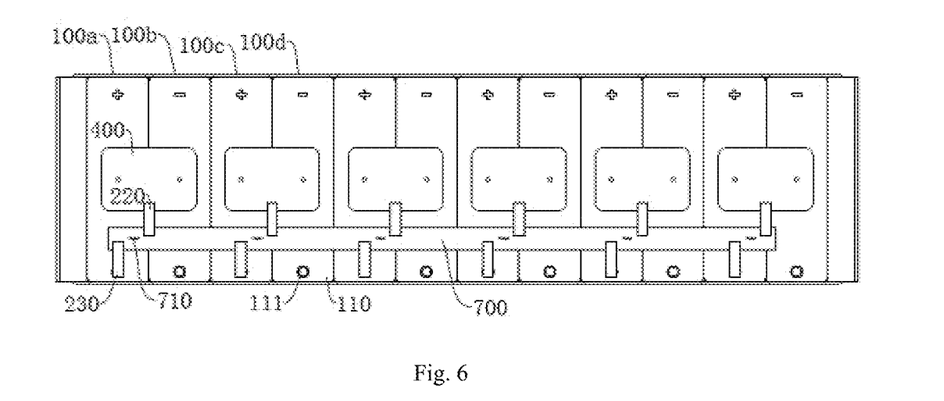
FIG. 6 is a structural schematic diagram of a first side of the battery provided in the embodiments of the application.

With reference to FIGS. 4-6, FIG. 4 is a structural schematic diagram of the second side of the battery 10 provided in the embodiments of the application; FIG. 5 is a structural schematic diagram, in another view, of the battery 10 provided in the embodiments of the application; and FIG. 6 is a structural schematic diagram of the first side of the battery 10 provided in the embodiments of the application.

The battery 10 provided in the embodiments of the application further includes a first bus component 400 arranged on the first side of the casing 110 and for being electrically connected to the electrode connecting portions 120 of the first battery unit 100a and the second battery unit 100b, so as to realize a series connection. The conductive component 200 is used for being electrically connected to the first bus component 400 and the casing 110.

The conductive component 200 in the embodiments may be connected to the casing 110 of the first battery unit 100a or the casing 110 of the second battery unit 100b, and the casing 110 to which the signal detection circuit 310 is connected is the same as the casing 110 to which the conductive component 200 is connected. For example, when the conductive component 200 is connected to the casing 110 of the first battery unit 100a, the signal detection circuit 310 is also connected to the casing 110 of the first battery unit 100a. When the conductive component 200 is connected to the casing 110 of the second battery unit 100b, the signal detection circuit 310 is also connected to the casing 110 of the second battery unit 100b.

In these embodiments, by arranging the first bus component 400, the first battery unit 100a and the second battery unit 100b may be connected in series, and the first bus component 400 is connected to the two electrode connecting portions 120 on the first side of the first battery unit 100a and the first side of the second battery unit 100b. The conductive component 200 is connected to the first bus component 400 and the casing 110, and is capable of transmitting electrical parameter information of the electrode connecting portions 120 on the first side of the first battery unit 100a and the first side of the second battery unit 100b to the second side of the casing 110 by means of the conductive component 200 and the casing 110. The signal detection circuit 310 may detect temperature or voltage signals of the first battery unit 100a and the second battery unit 100b on the second side of the casing 110, so as to further simplify a circuit arrangement of the while detection loop, and improve reliability of the detection loop.

Three or more battery units 100 may be arranged in the battery 10, and the battery unit 100 may further include a third battery unit 100c connected to the second battery unit 100b in series. The two electrode connecting portions 120 on the same battery unit 100 include a first electrode connecting portion 121 and a second electrode connecting portion 122, the first electrode connecting portion 121 being, for example, a positive electrode connecting portion, and the second electrode connecting portion 122 being, for example, a negative electrode connecting portion.

The conductive component 200 is connected to the casing 110 of one of the first battery unit 100a and second battery unit 100b. For example, when the casing 110 is an aluminum casing, the conductive component 200 is connected to the casing 110 where the positive electrode connecting portion is positioned. That is, the positive electrode connecting portion of the battery unit 100 is connected to the casing 110 thereof, such that the casing 110 is positively charged, and corrosion of the aluminum casing may be relieved. In other embodiments, for example, the casing 110 is a steel casing, and the conductive component 200 is connected to the casing 110 where the negative electrode connecting portion is positioned. That is, the negative electrode connecting portion of the battery unit 100 is connected to the casing 110 thereof, such that the casing 110 is negatively charged, and corrosion of the steel casing may be relieved.

In the embodiments of the application, the casing 110 being the aluminum casing, the first electrode connecting portion 121 being the positive electrode connecting portion, and the second electrode connecting portion 122 being the negative electrode connecting portion are taken as examples for illustration. Then, the conductive component 200 is connected to the first bus component 400 and the casing 110 of the first battery unit 100a.

With reference to FIGS. 2-6, when three or more battery units 100 are arranged in parallel in a thickness direction (that is a Y direction in FIG. 2), the first electrode connecting portions 121 and the second electrode connecting portions 122 are alternately arranged in sequence on the same side of the casing 110. The first bus component 400 is used for being connected to the first electrode connecting portion 121 of the first battery unit 100a and the second electrode connecting portion 122 of the second battery unit 100b.

The battery 10 further includes a second bus component 500 arranged on the second side of the casing 110 and for being connected to the first electrode connecting portion 121 of the second battery unit 100b and the second electrode connecting portion 122 of the third battery unit 100c. The signal detection circuit 310 is used for being electrically connected to the second electrode connecting portion 122 of the first battery unit 100a, the second bus component 500 and the casing 110.

In these embodiments, the first electrode connecting portions 121 and the second electrode connecting portions 122 are alternately distributed in sequence on the same side of the casing 110, such that the first bus component 400 on the first side of the casing 110 and the second bus component 500 on the second side of the casing 110 may be connected to the different electrode connecting portions 120 of the different battery units 100. For example, the first bus component 400 is connected to the first electrode connecting portion 121 of the first battery unit 100a and the second electrode connecting portion 122 of the second battery unit 100b, and the second bus component 500 is connected to the first electrode connecting portion 121 of the second battery unit 100b and the second electrode connecting portion 122 of the third battery unit 100c such that three or more battery units 100 may be connected in series through the first bus component 400 and the second bus component 500.

In the embodiments of the application, the first electrode connecting portion 121 of the first battery unit 100a forms, along with the second electrode connecting portion 122 of the first battery unit 100a, a detection loop by means of the first bus component 400, the conductive component 200, the casing 110 of the first battery unit 100a and the signal detection circuit 310 such that the signal detection component 300 may detect the temperature or voltage signal of the first battery unit 100a.

The second electrode connecting portion 122 of the second battery unit 100b is connected to the first bus component 400, the first electrode connecting portion 121 of the second battery unit 100b is connected to the second bus component 500, and the second electrode connecting portion 122 of the second battery unit 100b forms, along with the first electrode connecting portion 121 of the second battery unit 100b, a detection loop by means of the first bus component 400, the conductive component 200, the casing 110 of the first battery unit 100a, the signal detection circuit 310 and the second bus component 500 such that the signal detection component 300 may detect the temperature or voltage signal of the second battery unit 100b.

In some embodiments, when the first battery unit 100a is positioned at one end of a plurality of battery units 100 which are arranged side by side, that is, when the other battery units 100, except for the first battery unit 100a, in the plurality of battery units 100 are positioned on the same side in the Y direction of the first battery unit 100a, the second electrode connecting portion 122 of the first battery unit 100a and the signal detection circuit 310 may be directly connected to each other, or the first battery unit 100a and the signal detection circuit 310 may be directly connected to each other by means of a third bus component 600, the third bus component 600 being used for being connected to the second electrode connecting portion 122 of the first battery unit 100a and the signal detection circuit 310.

Unlike the first bus component 400 and the second bus component 500, the third bus component 600 is used for being connected to the electrode connecting portion 120 of one battery unit 100.

When other battery units 100 are further arranged on a side, away from the second battery unit 100b, of the first battery unit 100a, a plurality of second bus components 500 are provided. The second electrode connecting portion 122 of the first battery unit 100a and the first electrode connecting portions 121 of the other battery units 100 positioned on the side, away from the second battery unit 100b, of the first battery unit 100a are connected to each other by another second bus components 500, and the second bus component 500 and the signal detection circuit 310 are connected to each other.

When the third battery unit 100c is positioned at one end of a plurality of battery units 100 which are arranged side by side, that is, when no other battery unit 100 is arranged on a side, away from the first battery unit 100a and the second battery unit 100b, of the third battery unit 100c, the first electrode connecting portion 121 of the third battery unit 100c may be connected to the casing 110 of one of the second battery unit 100b and the third battery unit 100c by means of the conductive component 200. For example, the first electrode connecting portion 121 is the positive electrode connecting portion, the casing 110 is the aluminum casing, the first electrode connecting portion 121 of the third battery unit 100c may be connected to the casing 110 of the third battery unit 100c by means of the conductive component 200, and the second electrode connecting portion 122 of the third battery unit 100c may be connected to the signal detection circuit 310 by means of the second bus component 500.

When other battery unit 100 (such as a fourth battery unit 100d) are arranged on the side, away from the second battery unit 100b and the first battery unit 100a, of the third battery unit 100c, two or more first bus components 400 are arranged, the first electrode connecting portion 121 of the third battery unit 100c and the second electrode connecting portion 122 of the fourth battery unit 100d are connected to another first bus component 400, and the first bus component 400 is connected to the casing 110 of the third battery unit 100c by means of the conductive component 200. The signal detection circuit 310 and the first electrode connecting portion 121 of the third battery unit 100c are connected to each other by means of the casing 110 of the third battery unit 100c and the first bus component 400, and the signal detection circuit 310 and the second electrode connecting portion 122 of the third battery unit 100c are connected to each other by means of the second bus component 500, such that the signal detection circuit 310 forms, along with the first electrode connecting portion 121 and the second electrode connecting portion 122 of the third battery unit 100c, a detection loop.

With reference to FIGS. 2-6, twelve battery units 100 which are arranged in series are shown in FIGS. 2-6, and each battery unit 100 includes one battery cell 13. Therefore, the battery 10 of the embodiments of the application includes twelve battery cells 13 which are arranged in series.

The battery 10 includes six first bus components 400 and six conductive components 200, each first bus components 400 being connected to the first electrode connecting portion 121 and the second electrode connecting portion 122 of the two adjacent battery units 100 individually, and each conductive component 200 being connected to each first bus components 400 and the casing 110 individually. The battery 10 includes five second bus components 500 and two third bus components 600, wherein the third bus component 600 is only connected to the electrode connecting portion 120 of the battery unit 100 positioned at an end portion in an arrangement direction, while the second bus component 500 and the first bus component 400 are connected to the electrode connecting portions 120 of the adjacent two battery units 100.

In some other embodiments, the battery unit 100 may further include two or more battery cells 13 which are connected to each other in parallel. For example, when the battery 10 includes twelve battery cells 13, one battery unit 100 may include two battery cells 13 which are arranged in parallel, that is, the battery 10 includes six battery units 100. Accordingly, the battery 10 may include the three first bus components 400, the three conductive components 200, the two second bus components 500 and the two third bus components 600. The first bus component 400, the second bus component 500 and the third bus component 600 may be made of aluminum or copper.

The first bus component 400 may be arranged in various manners, and the first bus component 400 may be, for example, a wire, or the first bus component 400 is plate-shaped and covers the two electrode connecting portions 120 of the first battery unit 100a and the second battery unit 100b, such that the first bus component 400 and the two electrode connecting portions 120 of the first battery unit 100a and the second battery unit 100b are connected to each other.

The first bus component 400 and the conductive component 200 may be connected in various manners, with reference to FIGS. 5 and 6, in some embodiments, the first bus component 400 and the conductive component 200 are arranged separately. The conductive component 200 may be made of aluminum or copper and may be fixed, in a welded manner, to the casing 110 by means of the first bus component 400. The conductive component 200 includes a first pin 220 and a second pin 230 which are connected to each other, the first pin 220 being used for being electrically connected to the first bus component 400, and the second pin 230 being used for being electrically connected to the casing 110.

In these embodiments, the conductive component 200 includes the first pin 220 and the second pin 230 which are connected to the first bus component 400 and the casing 110 respectively, such that connections between the conductive component 200 and the first bus component 400 and between the conductive component 200 and the casing 110 may not affect each other, and assembly of the battery 10 may be simplified.

In some embodiments, the battery 10 further includes a connecting component 700, the first pin 220 and the second pin 230 are arranged separately, and the connecting component 700 is used for being electrically connected to the first pin 220 and the second pin 230.

In these embodiments, the connecting component 700 is connected to the first pin 220 and the second pin 230 such that the casing 110 may be electrically connected to the first bus component 400. Moreover, when the battery 10 includes three or more battery units 100, and two or more conductive components 200 are arranged, the first pins 220 and the second pins 230 of the two or more conductive components 200 may be connected to the same connecting component 700, so as to simplify a circuit arrangement in the battery 10.

For example, with reference to FIGS. 5 and 6, when the battery 10 includes twelve battery unit 100, each battery unit 100 includes one single battery cell 13, and the twelve battery unit 100 are connected to each other by means of six conductive components 200, the first pins 220 and the second pins 230 of the six conductive components 200 may be connected to each other by means of the same connecting component 700.

In some embodiments, the connecting component 700 is provided with a first fusing portion 710 for fusing when a current reaches a threshold value, such that an open circuit is formed between the first pin 220 and the second pin 230.

In these embodiments, the connecting component 700 is provided with the first fusing portion 710 which may break when the current reaches the threshold value, such that the open circuit is formed between the first pin 220 and the second pin 230, and safety performance of the battery 10 may be improved.

The first fusing portion 710 may be arranged in various manners, for example, the first fusing portion 710 may be a fuse arranged inside the connecting component 700. When the battery 10 includes a plurality of conductive components 200, the first pins 220 and the second pins 230 of the plurality of conductive components 200 are connected to each other by means of the same connecting component 700. A plurality of first fusing portions 710 are arranged, and each first fusing portion 710 is arranged between the first pin 220 and the second pin 230 of the corresponding conductive component 200.

Figure 7:
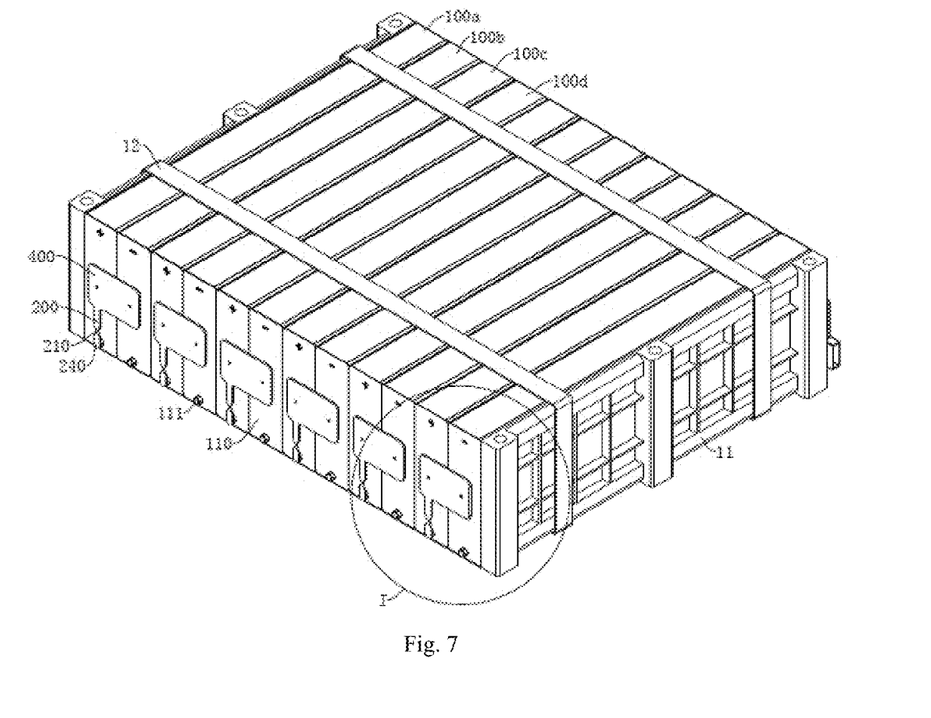
FIG. 7 is a structural schematic diagram of a battery provided in another embodiment of the application.
Figure 8:
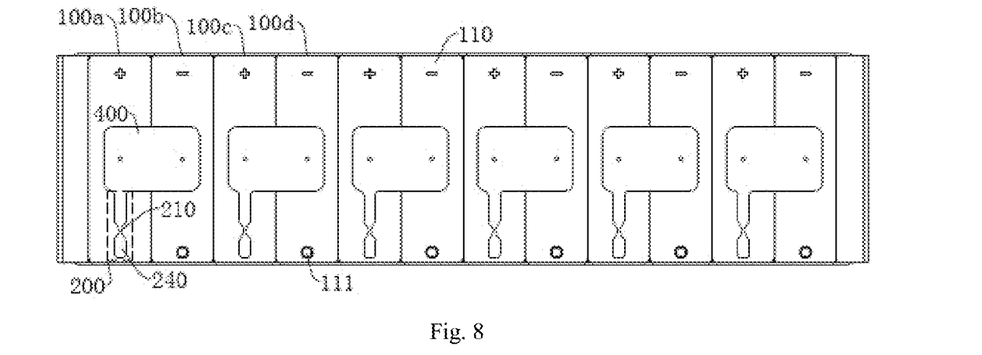
FIG. 8 is a structural schematic diagram of a first side of the battery provided in another embodiment of the application.

With reference to FIGS. 7 and 8, FIG. 7 is a structural schematic diagram of a battery 10 provided in another embodiment of the application; and FIG. 8 is a structural schematic diagram of a first side of the battery 10 provided in another embodiment of the application.

In some other embodiments, the first bus component 400 and the conductive component 200 may be integrally formed. The conductive component 200 is bounded by a dashed box in FIG. 8, and the dashed box is not intended to limit a structure of the battery 10 in the embodiments of the application. One side of the first bus component 400 extends outwards to form the conductive component 200, for example, one side in a height direction (Z direction in FIG. 2) of the first bus component 400 extends outwards to form the conductive component 200. In this way, structures of the conductive component 200 and the first bus component 400 may be simplified, and stability and reliability of a connection between the conductive component 200 and the first bus component 400 may be improved.

Figure 9:
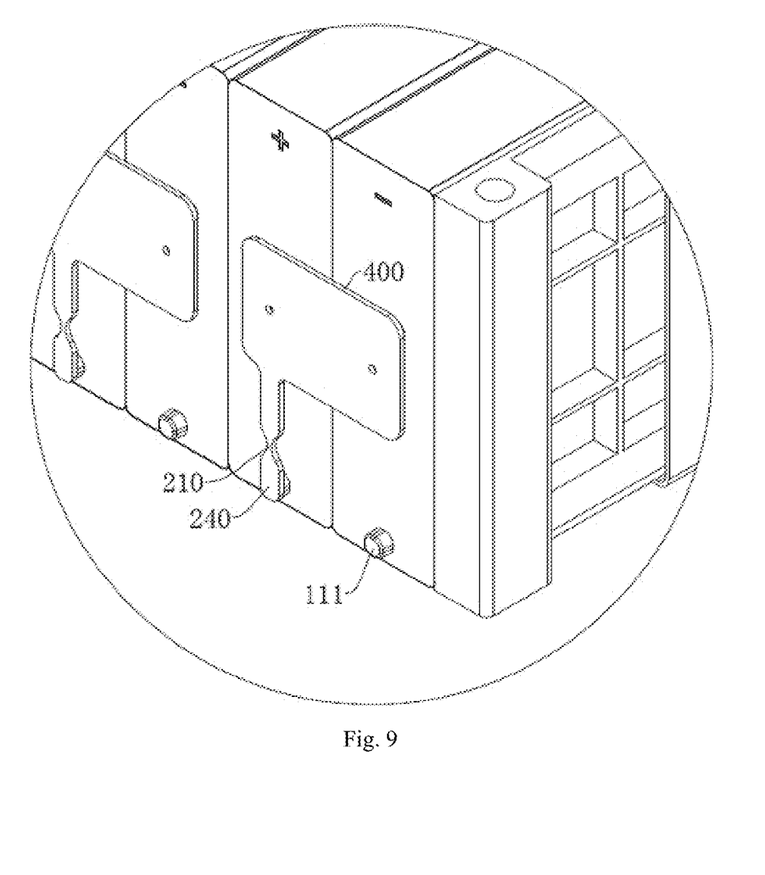
FIG. 9 is an enlarged structural schematic diagram of portion I in FIG. 7.

With reference to FIG. 9, FIG. 9 is an enlarged structural schematic diagram of portion I in FIG. 7.

According to the battery 10 provided in the embodiments of the application, the conductive component 200 may be provided with a second fusing portion 210 for fusing when a current reaches a threshold value, such that an open circuit is formed between the electrode connecting portion 120 and the casing 110. When the current on the conductive component 200 reaches the threshold value, the second fusing portion 210 fuses, such that the open circuit is formed between the electrode connecting portion 120 and the casing 110, and the safety performance of the battery 10 may be improved.

In some embodiments, a partial section of the conductive component 200 shrinks to form the second fusing portion 210.

In these embodiments, the partial section of the second fusing portion 210 is relatively small. When the current reaches the threshold value, the second fusing portion 210 fuses before the other positions of the conductive component 200 fuse, such that the conductive component 200 breaks from a position where the second fusing portion 210 is positioned, and an electrical connection between the electrode connecting portion 120 and the casing 110 is broken.

In addition, the partial section of the conductive component 200 shrinks to form the second fusing portion 210 such that the structure of the conductive component 200 may be simplified, a fuse does not need to be arranged in the conductive component 200, the conductive component 200 may be conveniently processed, formed and mounted, and manufacturing and mounting cost of the battery 10 is reduced.

In some other embodiments, the second fusing portion 210 may also be, for example, a fuse arranged inside the conductive component 200.

With further reference to FIGS. 7 and 8, when the conductive component 200 and the first bus component 400 are integrally formed, the conductive component 200 is, for example, plate-shaped, the partial section of the conductive component 200 shrinks to form the second fusing portion 210, and a width of the second fusing portion 210 is smaller than that of other positions on the conductive component 200. Since the second fusing portion 210 has a small size, and when the current on the conductive component 200 reaches the threshold value, the second fusing portion 210 fuses before the other positions of the conductive component 200, so as to form an open circuit.

When the conductive component 200 includes the first pin 220 and the second pin 230, the first pin 220 and the second pin 230 are connected to each other by means of the connecting component 700, the connecting component 700 is provided with the first fusing portion 710, and the conductive component 200 may be further provided with the second fusing portion 210. The second fusing portion 210 may be arranged on the first pin 220 and/or the second pin 230. The safety performance of the battery 10 may be further improved by means of the first fusing portion 710 and the second fusing portion 210.

Figure 10:
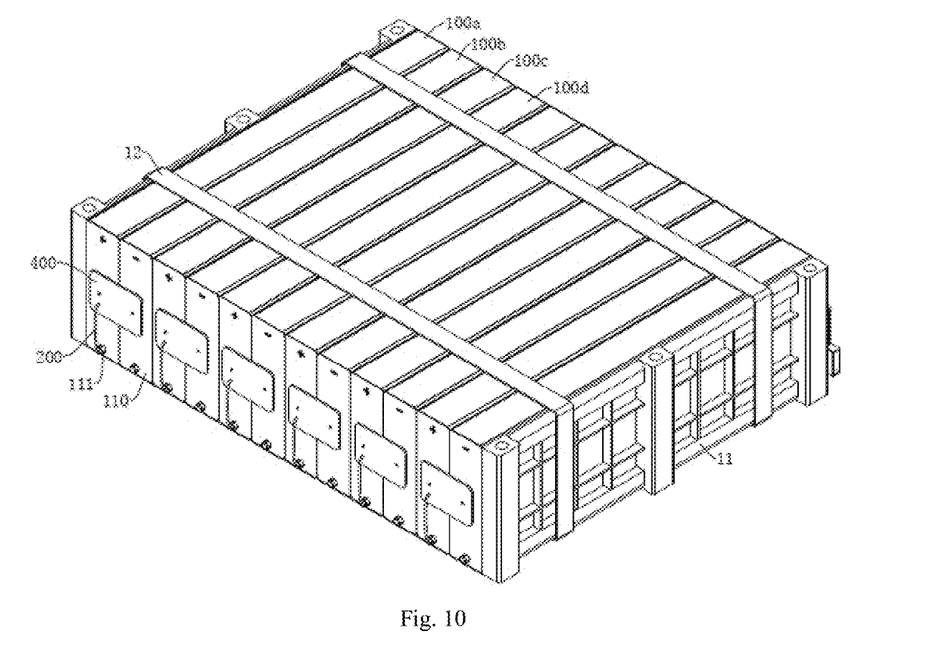
FIG. 10 is a structural schematic diagram of a battery provided in yet another embodiment of the application.
Figure 11:
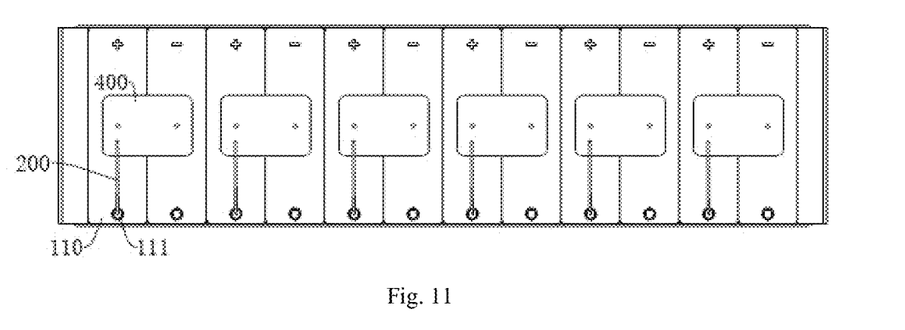
FIG. 11 is a structural schematic diagram of a first side of the battery provided in yet another embodiment of the application.

With reference to FIGS. 10 and 11, FIG. 10 is a structural schematic diagram of a battery 10 provided in yet another embodiment of the application; and FIG. 11 is a structural schematic diagram of a first side of the battery 10 provided in yet another embodiment of the application.

In some other embodiments, the conductive component 200 is a metal wire, such as an aluminum wire or a copper wire. The conductive component 200 is connected between the first bus component 400 and the casing 110. For example, one end of the conductive component 200 is connected to the first bus component 400 through a bonding process, and the other end of the conductive component 200 is connected to the casing 110 through the bonding process. Since a section area of the metal wire is relatively small, when the current on the conductive component 200 reaches the threshold value, the metal wire may break, such that an open circuit is formed between the first bus component 400 and the casing 110, and the safety performance of the battery 10 is improved.

The electrode connecting portion 120 of the battery unit 100 generally protrudes out of an outer surface of the casing 110. When the conductive component 200 is connected to the electrode connecting portion 120, a certain height difference may exist between the conductive component 200 and the outer surface of the casing 110, and the height difference may affect stability of a connection between the conductive component 200 and the casing 110.

With further reference to FIG. 9, in some embodiments, the electrode connecting portion 120 extends, in a first direction (X direction in FIG. 2), out of the outer surface of the casing 110. The casing 110 is provided with a first connecting portion 111, the conductive component 200 is provided with a second connecting portion 240, at least one of the first connecting portion 111 and the second connecting portion 240 extends in the first direction, and the first connecting portion 111 and the second connecting portion 240 are connected to each other such that the conductive component 200 is connected to the casing 110.

In these embodiments, by means of the first connecting portion 111 and/or the second connecting portion 240, a difference of a height, protruding out of the outer surface of the casing 110, of the electrode connecting portion 120 may be made up, such that the connection between the conductive component 200 and the casing 110 is more stable.

The first connecting portion 111 and the second connecting portion 240 may be arranged in various manners. For example, the first connecting portion 111 protrudes out of the outer surface of the casing 110, and the second connecting portion 240 is in lap joint with a surface, away from the casing 110, of the first connecting portion 111. In this way, the structure of the conductive component 200 may be simplified, and assembly of the conductive component 200 is facilitated.

In these embodiments, in some embodiments, the height, protruding out of the outer surface of the casing 110, of the first connecting portion 111 is equal to or similar to a height, protruding out of the outer surface of the casing 110, of the electrode connecting portion 120, such that the first connecting portion 111 may make up the difference of the height, protruding out of the outer surface of the casing 110, of the electrode connecting portion 120.

Figure 12:
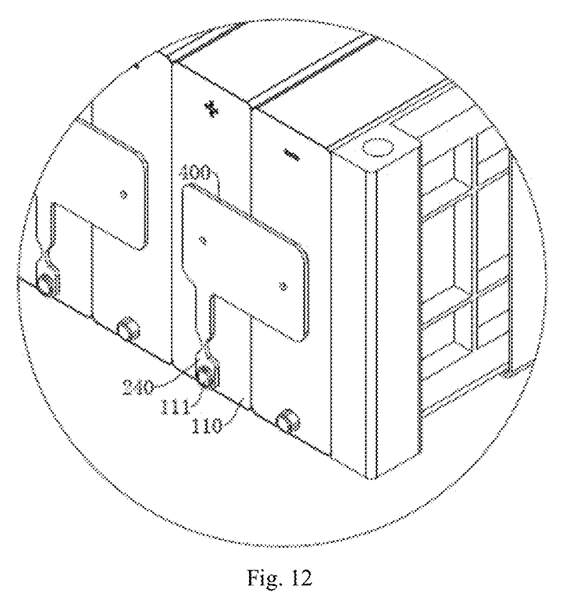
FIG. 12 is another embodiment of the enlarged structural schematic diagram of the portion I in FIG. 7.

With reference to FIG. 12, FIG. 12 is another embodiment of the enlarged structural schematic diagram of the portion I in FIG. 7.

In another embodiment, the first connecting portion 111 protrudes out of the outer surface of the casing 110, and the second connecting portion 240 is arranged around a peripheral side of the first connecting portion 111 such that stability of a connection between the first connecting portion 111 and the second connecting portion 240 may be improved.

Figure 13:
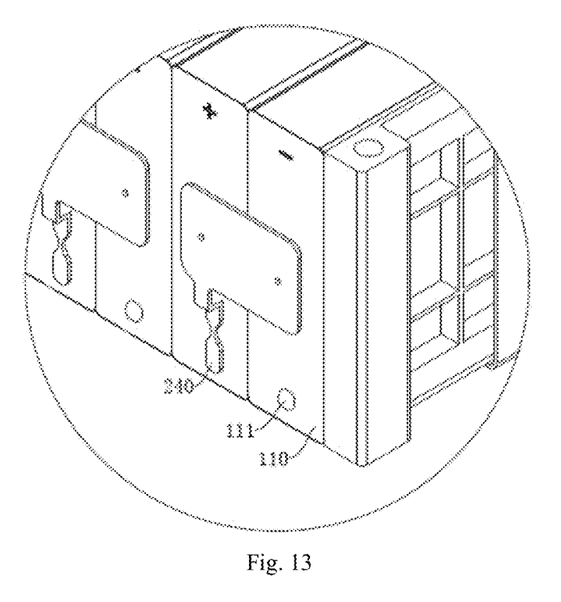
FIG. 13 is yet another embodiment of the enlarged structural schematic diagram of the portion I in FIG. 7.

With reference to FIG. 13, FIG. 13 is yet another embodiment of the enlarged structural schematic diagram of the portion I in FIG. 7.

In yet another embodiment, the conductive component 200 is bent in a direction close to the surface of the casing 110 to form the second connecting portion 240 such that the second connecting portion 240 may make up the difference of the height, protruding out of the outer surface of the casing 110, of the electrode connecting portion 120.

In some other embodiments, the first connecting portion 111 protrudes out of the outer surface of the casing 110, the conductive component 200 is bent in the direction close to the first connecting portion 111 to form the second connecting portion 240, and the first connecting portion 111 and the second connecting portion 240 make up the difference of the height, protruding out of the outer surface of the casing 110, of the electrode connecting portion 120 together.

In some embodiments, the battery 10 further includes side plates 11 and a fixing band 12, the side plates 11 being positioned on two sides in the thickness direction (that is the Y direction in FIG. 2) of a plurality of battery units 100, and the fixing band 12 surrounding a periphery of the side plates 11 and the plurality of battery units 100.

The application may be embodied in other specific forms without departing from the spirit and essential features thereof. For example, the algorithms described in particular embodiments may be modified without departing from the basic spirit of the application in the system architecture. Therefore, the embodiments are to be considered in all respects as illustrative and not restrictive, the scope of the application being defined by the appended claims rather than the foregoing description, and all changes that come within the meaning and scope of equivalents of the claims are therefore intended to be included within the scope of the application.

In the description of the application, the following is to be noted: unless otherwise specified, "plurality" means two or more; the terms "upper", "lower", "left", "right", "inner", "outer", etc. indicate azimuthal or positional relations only for ease of description of the application and for simplicity of description, and are not intended to indicate or imply that the referenced device or element must have a particular orientation and be constructed and operative in a particular orientation, and thus may not be construed as a limitation on the application. Moreover, the terms "first", "second", "third", etc. are merely for descriptions and may not be understood as indication or implication of relative importance. "Perpendicular" is not perpendicular in a strict sense, but within error allowance. "Parallel" is not parallel in a strict sense, but within error allowance.

What is claimed is:

1. A battery, comprising:
   at least two battery units which are connected in series, wherein each battery unit is provided with a casing and two electrode connecting portions which are arranged on two sides of the casing and have opposite polarities, and the at least two battery units connected in series comprise a first battery unit and a second battery unit;
   a conductive component arranged on one side of the casing and for being electrically connected to one of the two electrode connecting portions of the first battery unit and the casing of one of the first battery unit and the second battery unit; and
   a signal detection component arranged on the other side of the casing and provided with a signal detection circuit for being electrically connected to the other of the two electrode connecting portions of the first battery unit and the casing of one of the first battery unit and the second battery unit, wherein the signal detection circuit and the conductive component are electrically connected to the casing of the same battery unit such that the signal detection circuit can form, along with the two electrode connecting portions of the first battery unit, a detection loop by means of the casing of the same battery unit and the conductive component, so as to detect a temperature or voltage signal of the first battery unit.

2. The battery according to claim 1, wherein the followings are included:
   a first bus component arranged on one side of the casing and for being electrically connected to the electrode connecting portions of the first battery unit and the second battery unit, so as to realize a series connection,
   wherein the conductive component is used for being electrically connected to the first bus component and the casing.

3. The battery according to claim 2, wherein one side of the first bus component extends outwards to from the conductive component.

4. The battery according to claim 3, wherein the conductive component comprises a first pin and a second pin which are connected to each other, the first pin being used for being electrically connected to the first bus component, and the second pin being used for being electrically connected to the casing.

5. The battery according to claim 4, wherein the first pin and the second pin are arranged separately, and the battery further comprises a connecting component for being electrically connected to the first pin and the second pin.

6. The battery according to claim 5, wherein the connecting component is provided with a first fusing portion for fusing when a current reaches a threshold value such that an open circuit is formed between the first pin and the second pin.

7. The battery according to claim 6, wherein
   the two electrode connecting portions comprise a first electrode connecting portion and a second electrode connecting portion, the at least two battery units further comprise a third battery unit connected to the second battery unit in series, and the first electrode connecting portions and the second electrode connecting portions are alternately distributed in sequence on the same side of the casing;
   the first bus component is used for being connected to the first electrode connecting portion of the first battery unit and the second electrode connecting portion of the second battery unit; and
   the battery further comprises a second bus component arranged on the other side of the casing and for being connected to the first electrode connecting portion of the second battery unit and the second electrode connecting portion of the third battery unit, and the signal detection circuit is used for being electrically connected to the second electrode connecting portion of the first battery unit, the second bus component and the casing.

8. The battery according to claim 7, wherein the conductive component is provided with a second fusing portion for fusing when a current reaches a threshold value such that an open circuit is formed between the electrode connecting portion and the casing.

9. The battery according to claim 8, wherein a partial section of the conductive component shrinks to form the second fusing portion.

10. The battery according to claim 9, wherein the electrode connecting portion extends, in a first direction, out of an outer surface of the casing; and the casing is provided with a first connecting portion, the conductive component is provided with a second connecting portion, at least one of the first connecting portion and the second connecting portion extends in the first direction, and the first connecting portion and the second connecting portion are connected to each other such that the conductive component is connected to the casing.

11. The battery according to claim 10, wherein the first connecting portion protrudes, in the first direction, out of the outer surface of the casing; and the second connecting portion is in lap joint with a surface, away from the casing, of the first connecting portion, or the second connecting portion is arranged around a peripheral side of the first connecting portion.

12. A device, comprising the battery according to claim 11, the battery being used for supplying electrical energy.

* * * * *